United States Patent [19]
Waldenmaier et al.

[11] Patent Number: 5,159,408
[45] Date of Patent: Oct. 27, 1992

[54] OPTICAL THICKNESS PROFILER USING SYNTHETIC WAVELENGTHS

[75] Inventors: H. E. Waldenmaier, White Plains, N.Y.; P. J. DeGroot, Seattle, Wash.; G. H. Hayes, Winsted, Conn.

[73] Assignee: Hughes Danbury Optical Systems, Inc., Danbury, Conn.

[21] Appl. No.: 676,049

[22] Filed: Mar. 27, 1991

[51] Int. Cl.$^5$ ............................................. G01B 11/02
[52] U.S. Cl. ................................. 356/357; 356/359; 356/360; 356/349
[58] Field of Search ............... 356/349, 360, 352, 356, 356/357, 358, 359

[56] References Cited

U.S. PATENT DOCUMENTS

| | | | |
|---|---|---|---|
| 4,886,362 | 12/1989 | Oono | 356/360 |
| 5,054,924 | 10/1991 | Hochberg | 356/359 |

Primary Examiner—Samuel A. Turner
Assistant Examiner—LaCharles P. Keesee
Attorney, Agent, or Firm—W. K. Denson-Low; W. J. Streeter; R. A. Hays

[57] ABSTRACT

Optical metrology method and apparatus wherein three optical wavelengths of a fixed polarization are generated and separated into a reference beam (RB) and a measurement or object beam (OB) having, ideally, equal optical path lengths. After reflecting from surfaces being measured OB is combined with RB and provided to sensors which measure the intensity associated with each of the wavelengths. Any difference between the intensities is indicative of a difference in the optical path lengths of OB and RB and is a function of the polarization state of each of the three returned wavelengths. Differences in optical path length may be indicative of a difference between a reference surface and a test surface, or a difference in thickness or index of refraction across an object. Two multi-mode laser diodes (12, 14) are provided for generating the three optical wavelengths. Two synthetic wavelenths are derived from the three optical wavelengths and are employed to improve the precision of measurement while retaining a large dynamic range made possible by the use of a large synthetic wavelength.

26 Claims, 4 Drawing Sheets

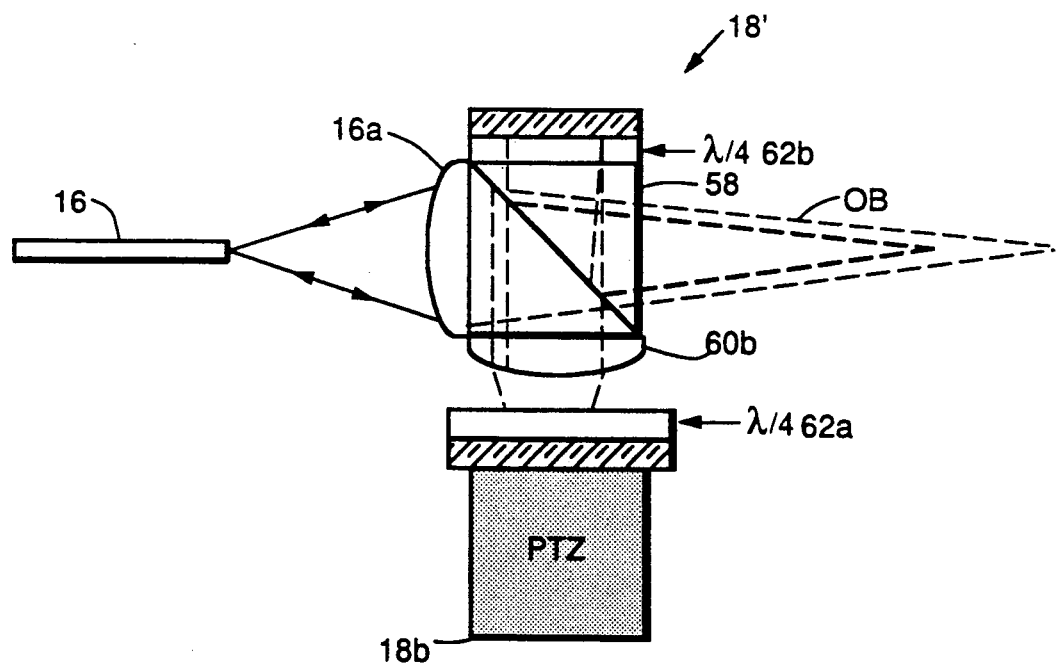
FIG. 5.
FIG. 6.
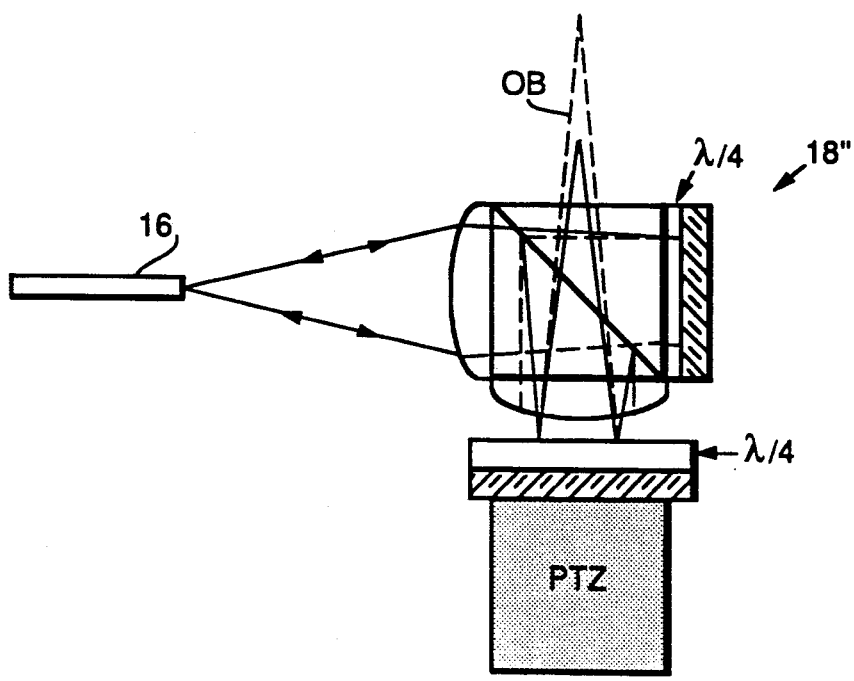

OPTICAL THICKNESS PROFILER USING SYNTHETIC WAVELENGTHS

CROSS REFERENCE TO A RELATED PATENT APPLICATION

This U.S. patent application is related to a copending and commonly assigned U.S. patent application Ser. No. 07/676,144, filed Mar. 27, 1991, entitled "Three Wavelength Optical Measurement Apparatus and Method", by Peter J. deGroot.

FIELD OF THE INVENTION

This invention relates generally to optical metrology and, in particular, to optical metrology apparatus and method that employs two synthetic wavelengths and an optical wavelength to obtain sub-nanometer measurement resolution when measuring a displacement between two surfaces.

BACKGROUND OF THE INVENTION

One known method to extend the range of optical metrology applications for interferometry is to measure the interferometric phase at two distinct wavelengths.

When monochromatic light is made to interfere with itself in a two-beam interferometer, the output intensity as measured by a square-law detector is proportional to a function h:

$$h(mx) = \cos^2(\pi m), \qquad (1)$$

where m is the fringe order, equal to one over $2\pi$ times the relative phase of one beam to the other. The optical path difference between the two beams is related to the fringe order by $$L = m\lambda/2, \qquad (2)$$

where L is the one-way optical path difference, including the refractive index, and $\lambda$ is the vacuum wavelength. In that h is a periodic function, the integer part of m cannot be determined by inverting Eq. (1). Interferometry typically provides only the fractional part f(m) of the fringe order, with the consequence that only changes of the length L, and not its absolute value, can be measured directly. This integer fringe-order ambiguity limits the usefulness of interferometry in many applications.

The purpose of multiple-color, or multiple-wavelength, interferometry is to measure the integer part of m so that the entire length L may be directly measured with great precision in terms of the vacuum wavelength.

Analytical procedures for determining lengths from multiple-wavelength interferometry exist in a variety of forms. One such procedure employs the concept of synthetic wavelengths, derived from differences in pairs of wavelengths in the interferometer, and the corresponding synthetic fringe orders, derived from differences in the phase measurements for these wavelengths.

By example, and considering three optical wavelengths $\lambda_1$, $\lambda_2$, and $\lambda_3$, there are three possible synthetic wavelengths defined by $$1/\Lambda_{ij} = 1/\lambda_i - 1/\lambda_j, \; \lambda_j > \lambda_i. \qquad (3)$$

It is noted that a synthetic wavelength can be made much larger than a visible wavelength by choosing appropriate pairs of wavelengths $\lambda_i$, $\lambda_j$. The fractional part of the corresponding synthetic fringe orders $M_{ij}$ are obtained from the differences in optical fringe orders $m_i$ and $m_j$ as:

$$M_{ij} = m_i - m_j \qquad (4)$$

The length L may be calculated from a synthetic wavelength measurement as:

$$L = (M_{ij}\Lambda_{ij})/2. \qquad (5)$$

The larger the synthetic wavelength the greater the range of distances L that can be accommodated without possibility of error due to an integer ambiguity in the value of $M_{ij}$. Conversely, the precision in the measurement of L is optimized when using relatively small synthetic wavelengths.

The following prior art discuss various aspects of conventional two-wavelength interferometry.

As described in U.S. Pat. No. 4,832,489, issued May 23, 1989, to J.C. Wyant et al., a two-wavelength phase-shifting interferometer employs two laser sources for reconstructing steep surface profiles, such as aspheric surfaces. A 256×256 detector array is used and the computes an equivalent phase independently each detector.

The following articles discuss various aspects of employing a synthetic wavelength for surface profilometry.

In an article entitled "Contouring Aspheric Surfaces Using Two-Wavelength Phase-Shifting Interferometry" by K. Creath, Y. Cheng, and J. Wyant, Optica Acta, 1985, Vol. 32, No. 12, 1455–1464 there is described two-wavelength holography using an argon-ion laser and a He-Ne laser. Two wavelengths from the argon-ion laser (0.4880 micrometers or 0.5145 micrometers) were employed in conjunction with a single wavelength (0.6328 micrometers) from the He-Ne laser to yield equivalent wavelengths of 2.13 micrometers and 2.75 micrometer. An uncoated test surface was placed in one arm of the interferometer and interferograms were recorded using a 100×100 diode array.

In an article entitled "Absolute Optical Ranging with 200-nm Resolution" by C. Williams and H. Wickramasinghe, Optics Letters, Vol. 14, No. 11, Jun. 1, 1989 there is described optical ranging by wavelength-multiplexed interferometry and surface profiling said to be carried out on an integrated circuit structure. A pair of GaAlAs single-mode diode lasers are used as optical sources.

In an article entitled "Two-wavelength scanning spot interferometer using single-frequency diode lasers" by A. J. de Boef, Appl. Opt., Vol. 27, No. 2, Jan. 15, 1988 (306-311) there is described the use of two single frequency laser diodes to measure the profile of a rough surface. The two wavelengths are not time-multiplexed but are instead continuously present.

In an article entitled "Two-Wavelength Speckle Interferometry on Rough Surfaces Using a Mode Hopping Diode Laser" by A. Fercher, U. Vry and W. Werner, Optics and Lasers in Engineering 11, (1989) pages 271-279 there is described a time-multiplexed two-wavelength source consisting of a single mode diode that is switched between two adjacent oscillation modes. The switching is accomplished by pump-current modulation with the diode thermally tuned to a region near a so-called "mode hop", that is, near a region where the diode output readily switches from one wavelength output to another. This technique is said to have enabled the profiling of a ground lens surface.

As was previously stated, the larger the synthetic wavelength, the greater the range of distances (L) that can be accommodated without possibility of error due to an integer ambiguity in the value of the synthetic wavelength fringe order ($M_{ij}$).

However, the precision in the measurement of L is best when small synthetic wavelengths are used.

It is thus an object of the invention to provide optical metrology apparatus, including apparatus for determining a distance between two surfaces, that employs a plurality of synthetic wavelengths of different size.

It is a further object of the invention to provide optical metrology apparatus, including apparatus for determining a distance between two surfaces, that employs a plurality of synthetic wavelengths of different size, the synthetic wavelengths being derived from three optical wavelengths emitted from at least one and preferably two multi-mode laser diodes.

It is another object of the invention to provide optical metrology apparatus, including apparatus for determining a distance between two surfaces, that employs a plurality of synthetic wavelengths of different size, using progressively smaller synthetic wavelengths to improve the precision of measurement while retaining the dynamic range made possible by a large synthetic wavelength.

SUMMARY OF THE INVENTION

The foregoing and other problems are overcome and the objects of the invention are realized by method and apparatus for performing optical metrology. In accordance with a method of the invention, and apparatus for accomplishing same, a first step generates an optical output having a plurality of optical wavelengths. A next step modifies the optical output to provide a phase modulated reference beam and a measurement beam that are orthogonally polarized with respect to one another. The reference and measurement beams are directed to and reflected from the surfaces of interest. A further step combines the phase modulated reference beam and the reflected measurement beam into a combined beam. A next step detects, in accordance with a polarization state of three optical wavelengths within the combined beam, a difference between an optical path length of the reference beam and an optical path length of the measurement beam. The difference in path lengths is indicative of an absolute distance L between the two surfaces.

The teaching of the invention provides an optical metrology system wherein three optical wavelengths of a fixed polarization are separated into two beams (OB and RB) having, ideally, nearly equal optical path lengths. The two beams are recombined and provided to sensors which measure the intensity associated with each of the wavelengths.

The optical measurement apparatus of the invention preferably employs a plurality of multi-mode laser diodes for generating three optical wavelengths. Two synthetic wavelengths are derived from the three optical wavelengths. The synthetic wavelengths are of different size and progressively smaller synthetic wavelengths are employed to improve the precision of measurement while retaining a large dynamic range made possible by the use of a large synthetic wavelength.

BRIEF DESCRIPTION OF THE DRAWING

The above set forth and other features of the invention are made more apparent in the ensuing Detailed Description of the Invention when read in conjunction with the attached Drawing, wherein:

FIG. 5 illustrates a further embodiment of optical apparatus for separating, refocusing, phase modulating and recombining the separated beam with the original optical axis of the unseparated beam; and FIG. 6 illustrates another embodiment of optical apparatus for separating, refocusing, phase modulating and recombining the separated beam with the original optical axis of the unseparated beam.

DETAILED DESCRIPTION OF THE INVENTION

Figure 1:
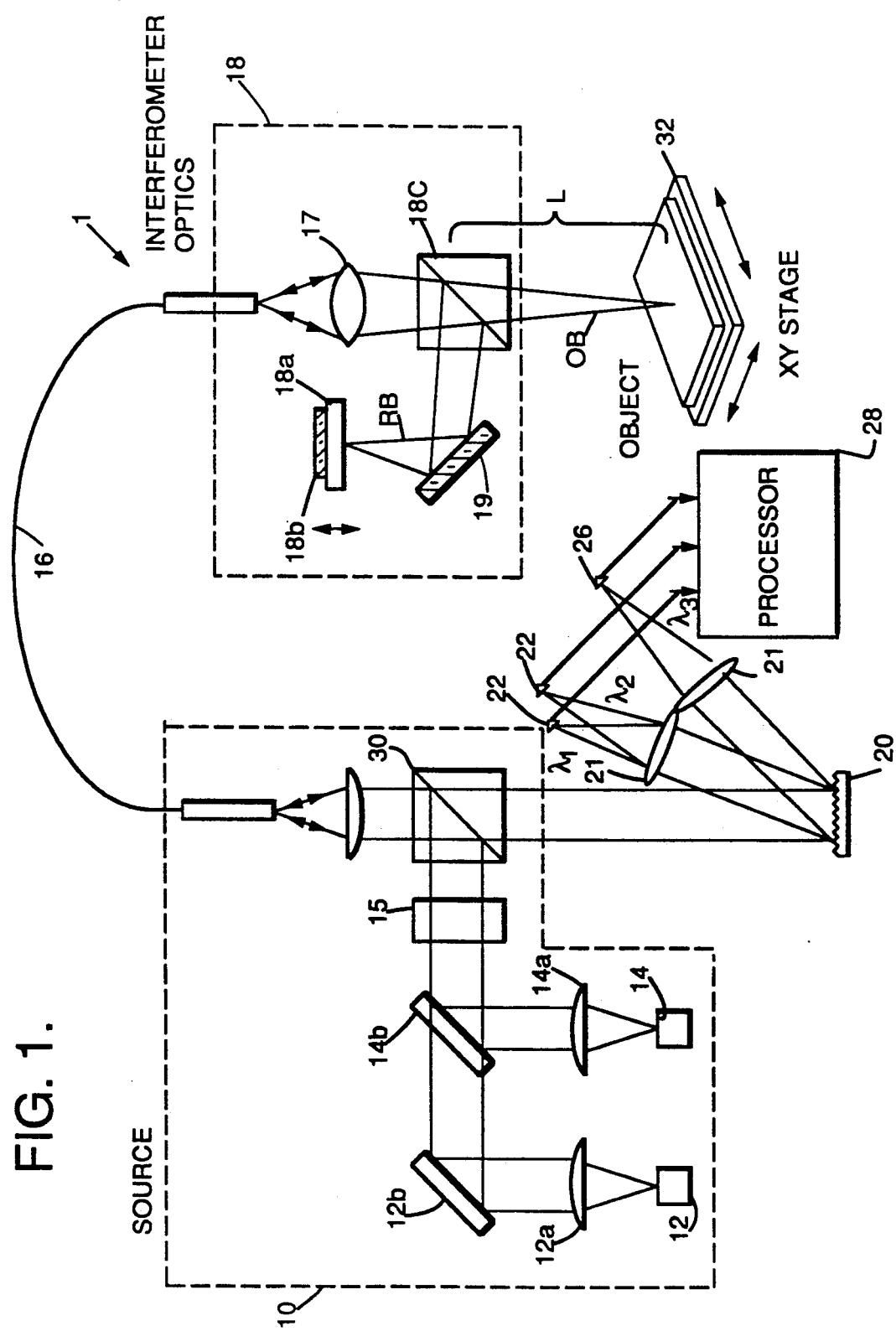
FIG. 1 is a simplified block diagram of a three-color interferometer for performing absolute distance measurement and surface profiling.

Referring first to FIG. 1 there is shown a three-wavelength, or three-color, optical metrology system 1 that is constructed and operated in accordance with the teaching of the invention. System 1 includes a three-wavelength source 10 that includes, preferably, two multi-mode laser diodes 12 and 14, collimating optics 12a and 14a, mirrors 12b and 14b, and an optical isolator 15. The laser diodes 12 and 14 are simultaneously operated and the emission from each is transmitted through an optical fiber 16 to phase-modulating, two-beam polarizing interferometer optics 18. A reflected object, or measurement, beam and a reference beam are recombined and transmitted back through the optical fiber 16 to a wavelength separating element, such as a diffraction grating 20. The wavelength separating element could also be comprised of a prism or of optical filters. Detectors 22, 24 and 26 are positioned in space to intercept the separated wavelengths provided by the grating 20, via focussing optics 21, and to measure the intensity of the three different wavelengths. A processor 28 calculates fringe orders and determines an absolute distance (L) to the object surface.

Figure 1A:
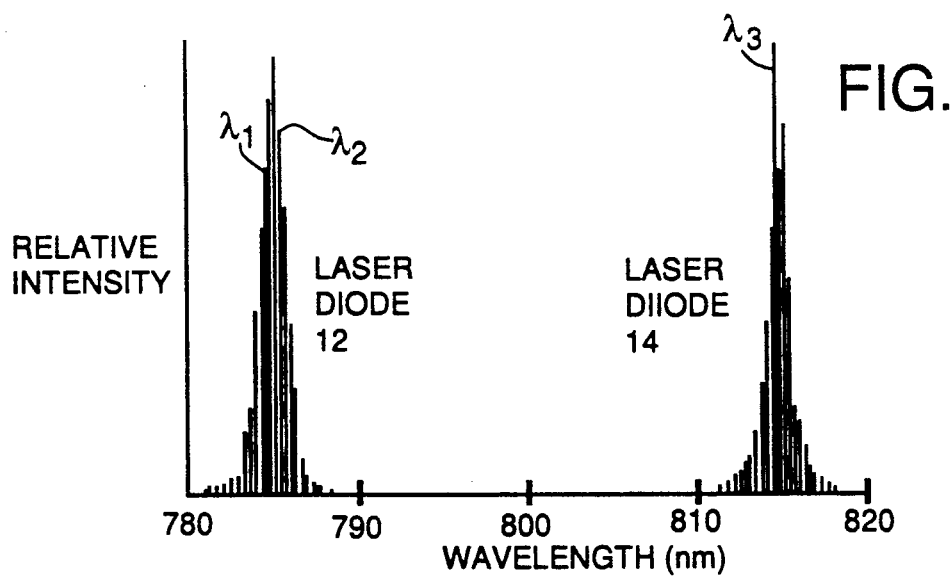
FIG. 1a is a graph showing the combined optical spectrum of two multi-mode laser diodes.

As can be seen in the graph of FIG. 1a in the three-wavelength interferometer system 1 two different wavelengths ($\lambda_1, \lambda_2$) in the 785 nm region of the spectrum are selected to derive a first synthetic wavelength $\Lambda_{12} = 720$ micrometers, and $\lambda_1$ is combined with a third wavelength $\lambda_3$ from the 815 nm region for generating a significantly smaller synthetic wavelength $\Lambda_{13} = 20$ micrometers. The laser wavelength separation required for a $\Lambda_{13} = 20$ micrometer synthetic wavelength is 32 nm, which is relatively very large when compared to the 0.3 nm mode separation of a typical laser diode. Thus, two diodes are required, with different center wavelengths. In principle, since only three wavelengths are used, one laser diode may be a multi-mode device and the other a single-mode device. However, the use of two multi-mode laser diodes is preferred in that undesirable mode hopping associated with single-mode laser diodes is avoided. Two suitable multi-mode laser diodes are Sharp LT010MDO and LT023MDO laser diode devices.

The optical fiber 16 spatially filters the emissions of the laser diodes 12 and 14 and facilitates the mechanical mounting of the interferometer optics 18 for different measurement tasks. The optical fiber 16 is preferably a single-mode, polarization-preserving fiber. The source light from the optical fiber 16 is focussed at the object surface by optical element 17 and is split into a measurement, or object beam (OB), and into a reference beam (RB). Reference beam RB is directed, via a reflector 19, to a mirror 18a that is coupled to a piezo-electrical transducer 18b. The mirror 18a is oscillated by the transducer 18b and functions to phase modulate the reference beam RB. Suitable oscillation frequencies in the range of approximately zero to approximately 1000 Hz may be employed, although the teaching of the invention is not limited to this range. For example, an electro-optical device such as a Kerr cell may be employed to achieve significantly greater rates of oscillation. OB and RB are given fixed orthogonal polarizations by a polarizing beamsplitter 18c. As a result, when the two beams are recombined into the optical fiber 16 after reflection, the resultant polarization vector rotates with the phase modulation. The light from the interferometer optics 18 is transmitted back through the fiber optic 16 to a polarizing beamsplitter 30 at the source end of the optical fiber 16. The reflected light is analyzed after passing through the beamsplitter 30. The light is separated into its constituent wavelengths by the diffraction grating 20 such that the individual wavelengths of the combined optical spectra appear as a series of spatially distinct points in space. The detectors 22, 24, and 26 are positioned at these spatially distinct points for detecting the intensity associated with each of the three wavelengths. The operation of the phase modulator of the interferometer optics 18 results in a wavelength-dependent and a phase-dependent amplitude modulation of the radiation.

As can be seen, the teaching of the invention provides an optical metrology system wherein three wavelengths of a fixed polarization are separated into two beams (OB and RB) having, ideally, equal optical path lengths. The two beams are recombined and provided to sensors which measure the intensity associated with each of the wavelengths. Any difference between the intensities is indicative of a difference in the optical path lengths of OB and RB and is a function of the polarization state of each of the three returned wavelengths. Differences in optical path length may be indicative of a displacement of the object being measured, as in the embodiment of FIG. 1. As will be described below, differences in optical path length may also be indicative of a difference between a reference surface and a test surface, as in the embodiment of FIG. 2, or a difference in thickness across an object, as in the embodiment of FIG. 3.

The processor 28 may actively control the phase modulation of the interferometer optics 18 while recording the intensity measured by the three detectors 22, 24 and 26. Alternately, the phase modulator may run at a fixed rate and the processor 28 may employ well known statistical methods applied over a group of samples. In either case, a suitable phase demodulation algorithm is used to determine the optical fringe orders ($m_i$) corresponding to the three wavelengths $\lambda_i$. One suitable phase demodulating algorithm is known as a five point algorithm and is described by P. Harihan, B. F. Oreb and T. Eiju in Appl. Opt. 26 2504 (1987). Length calculations involving Eq.(6), Eq.(7) and Eq.(8), described below, are performed in software and the results may be displayed to an operator and/or stored on disk.

Although not shown in FIG. 1 the system 1 includes laser diode power supplies, thermoelectric coolers, detector amplifiers, a piezoelectric driver, and an analog input interface that couples the detector outputs to the processor 28.

In accordance with an aspect of the invention there are considered three wavelengths $\lambda_1 < \lambda_2 < \lambda_3$, and two corresponding synthetic wavelengths $\Lambda_{12} > \Lambda_{13}$. The procedure for measuring an absolute distance L with interferometric resolution is as follows.

Assuming that L is less than $\Lambda_{12}/4$, the integer part of the synthetic fringe order $M_{12}$ is zero, and $$M_{12} = f(M_{12}) = f(m_1) - f(m_2). \quad (6)$$

The fractional parts $f(m_i)$ of the interferometric fringe orders $m_i$ are obtained by inverting Eq. (1) or by performing some equivalent phase-detection algorithm. A next step uses the shorter synthetic wavelength $\Lambda_{13}$ to increase the precision in the measurement. The following equation makes use of $M_{12}$ in calculating $M_{13}$ without an integer ambiguity:

$$M_{13} = f(M_{13}) + I((M_{12}\Lambda_{12}/\Lambda_{13}) - f(M_{13})). \quad (7)$$

The function I(a) appearing in Eq.(7) yields the integer nearest to the argument a. The optical fringe order $m_1$ is now calculated from $$m_1 = f(m_1) + I((M_{13}\Lambda_{13}/\lambda_1) - f(m_1)). \quad (8)$$

The final step employs Eq.(5) to determine the distance L. The measurement of L is thus accomplished as a three-step process, wherein $M_{12}$ is used to remove the integer fringe order ambiguity in the calculation of $M_{13}$, and $M_{13}$ is used in the calculation of $m_1$. This technique results in interferometric accuracy, but without the integer fringe-order ambiguity of conventional single-wavelength interferometry.

For the illustrated embodiment the largest synthetic wavelength is 720 micrometers and the distance L is measured absolutely over a ±180 micrometer range about zero. When L is equal to zero there is no optical path length difference between the reference and object beams in the interferometer optics 18. For values of L outside this ±180 micrometer range the measurement is relative, with an ambiguity interval of 360 micrometers. However, for many metrology applications there is sufficient knowledge of the object under measurement to remove this ambiguity.

The synthetic wavelengths are chosen so as to substantially eliminate a possibility of introducing integer errors in Eq. (7) and Eq. (8).

Figure 2:
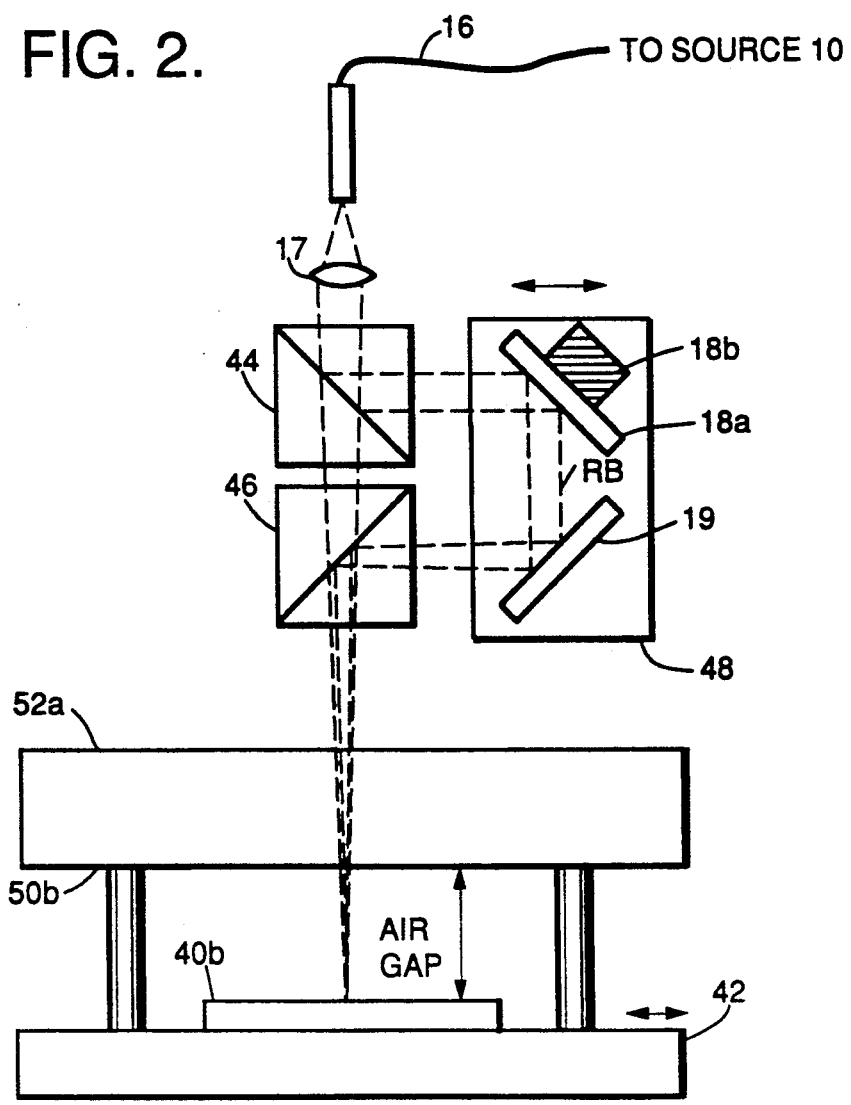
FIG. 2 shows alternative profilometry geometry for the interferometer optics depicted in FIG. 1, the embodiment of FIG. 2 performing a comparison between a reference surface and an object surface.

In accordance with an embodiment of the invention reference is now made to FIG. 2 which shows alternative profilometry geometry for the interferometer optics depicted in FIG. 1, the embodiment of FIG. 2 being suitable for performing a comparison across an air gap between a reference surface 40a and an object surface 40b. Both the reference and object are mounted to a common XY stage 42 such that mechanical errors in the stage motion do not affect the profile measurement. In this embodiment the single polarizing beamsplitter 18c of FIG. 1 is replaced by a pair of polarizing beam splitters 44 and 46. The mirror 18a, piezoelectric actuator 18b, and reflector 19 are mounted to a translating stage 48 for adjusting for any path length differences between the RB and OB. An optical path length is referenced to the surface 40a.

Focussing element 17 is a two conjugate lens device that provides two distinct focal points, one at the reference surface 40a and the other at the object surface 40b. Optical fiber 16 is coupled at an opposite end to the three-wavelength source 10 and other components as illustrated in FIG. 1.

In operation, the XY stage 42 translates the reference surface 40a and the object surface 40b perpendicularly to the axis of OB. A variation between the reference surface 40a and the object surface 40b causes a change in the optical path length of the object beam OB relative to the reference beam RB and a change in the phase of OB relative to the phase of RB. The optical path length difference between surfaces 40a and 40b is a function of a displacement, or of a change in refractive index of the media, between the surfaces of interest. The change in optical path length is measured by applying Eqs. (7), (8) and (2) after detection of the relative interferometric phase at each of the three wavelengths.

Figure 3:
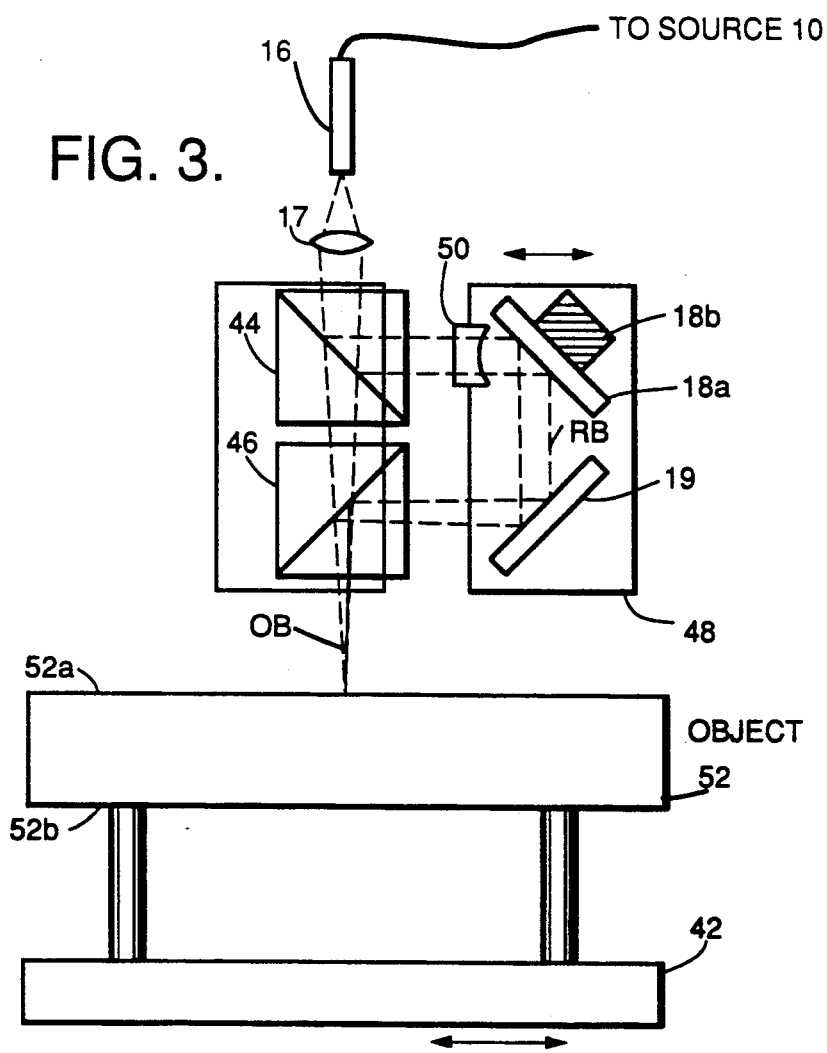
FIG. 3 depicts alternative profilometry geometry for the interferometer optics depicted in FIG. 1, the embodiment of FIG. 3 performing a thickness measurement of an object.

The geometry of FIG. 2 may also be employed, with the modifications depicted in FIG. 3, for obtaining a relative thickness profile of an object, such as a glass blank. Instead of measuring the air gap between the reference and object surfaces there is measured instead the optical path length from a first surface 52a to an opposite surface 52b. Focussing element 17 is, as before, a two conjugate lens device that provides two distinct focal points, one at the surface 52a and the other at the surface 52b. By example, element 17 is a +20 mm f.l lens. A diverging lens 50, by example −200 mm f.l, is disposed in the path of the folded reference beam to lengthen the second focal point and compensate for refraction at the top surface. The compensation by lens 50 is required because of refractive index of the glass blank under test.

In operation, the XY stage 42 translates the object 52 first and second surfaces 52a and 52b perpendicularly to the axis of OB. A variation in thickness of the object 52 causes a change in the optical path length relative to the reference beam RB. The change in optical path is measured by applying Eqs. (7), (8) and (2) after detection of the relative interferometric phase at each of the three wavelengths.

Figure 4:
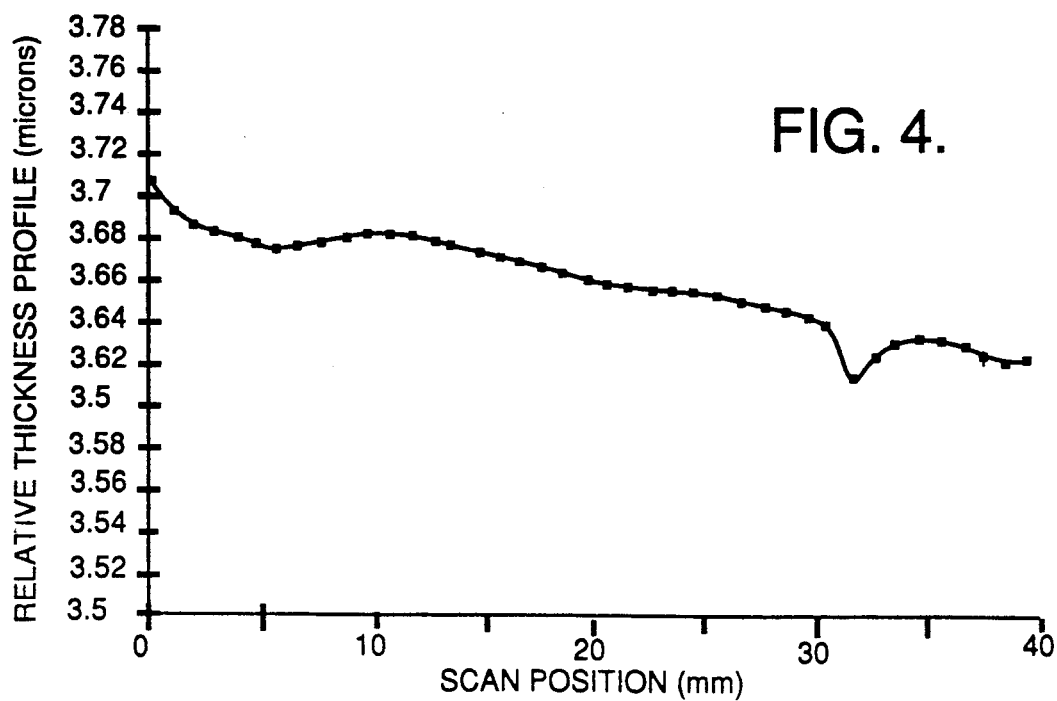
FIG. 4 is a graph depicting a relative optical thickness of an optical flat as a function of scan position, the data being obtained with the apparatus of FIG. 3.

FIG. 4 is a graph depicting a relative optical thickness of a polished Zerodur optical flat as a function of scan position, the data being obtained with the apparatus of FIG. 3. The data represents a point-by-point scan of the flat and indicates a −2.3 nm/mm tilt.

FIGS. 5 and 6 illustrate further embodiments of optical apparatus for separating, refocusing, phase modulating and recombining the separated beam with the original optical axis of the unseparated beam. Specifically, there is illustrated in FIG. 5 a further embodiment of the two beam interferometer optics 18'. Interferometer optics 18' includes one polarizing beamsplitter 58 having lenses 60a and 60b disposed upon adjacent surfaces. The beamsplitter 58 is employed with the piezoelectric actuator 18b which has a first mirror coated quarter wavelength retardation plate 62a coupled thereto. A second mirror coated quarter wave retardation plate is disposed upon the opposite surface of beamsplitter 58. This configuration provides an object beam OB having two focal points as shown. This configuration also functions to separate an individual linear polarized beam from a single beam containing two orthogonal polarizations and to refocus, phase modulate and recombine the separated beam with the original optical axis of the unseparated beam. As previously described, the absolute change optical path between the points of focus is computed from the known phase modulation and the absolute phase shift of the three discrete wavelengths common to each beam.

FIG. 6 illustrates the same components as FIG. 5 arranged in such a fashion to provide two beam interferometer optics 18,, wherein the object beam OB axis is disposed perpendicularly to the input/output beam axis.

In the embodiments depicted in FIGS. 5 and 6 the mirror coated retardation plates 62a and 62b convert the beam that is reflected (transmitted) by the polarized beamsplitter 58 into a beam that is transmitted (reflected) by the same surface of the beamsplitter 58. A double application of this technique recombines the separated beams into a common beam. Also, the phase modulating mirror 62a may be retracted until the focus of that beam is on the last optical surface of device. In this configuration, the device functions as non-contact probe which measures absolute distances from the device itself.

The embodiments of FIGS. 5 and 6 eliminate one of the polarized beam splitters of the embodiments of FIG. 2 and FIG. 3 and also the mirror pair 18a and 19 which function as a roof prism. In the configuration of FIGS. 5 and 6 the mirror coated retardation plate 62b is optically contacted with the beamsplitter 58 to form a monolithic unit. This leaves only the retardation plate 62a to be mounted external to the monolithic unit.

Although the present invention has been described in the context of specific wavelengths and optical components it should be realized that other wavelengths and more or less than the number of optical components shown in the Figures may be employed, while yet obtaining the same result. Also, although the various lens elements are depicted as simple lens elements it should be realized that each may include a number of optical components to achieve the desired function. As a further example of a modification to the teaching of the invention, in FIGS. 5 and 6 the mirror coated retardation plate 62a may be given a concave shape to provide a focussing reflector, thereby eliminating the requirement for the lens 60b. Thus, while the present invention has been particularly shown and described with respect to an embodiment thereof, it will be understood by those skilled in the art that changes in form and details may be made therein without departing from the scope and spirit of the invention.

What is claimed is:

1. Optical metrology apparatus comprising:
   optical source means having an output beam that includes at least three discrete optical wavelengths;
   means, coupled to an output of the optical source means, for separating the output beam into a reference beam and into a measurement beam, the reference beam and the measurement beam having a fixed polarization relationship one to another, the separating means including means for directing the measurement beam to a first surface of interest and to a second surface of interest;

means for combining into a combined beam the reference beam and a portion of the measurement beam that reflects from the surfaces of interest; and means, responsive to a polarization state of each of the three optical wavelengths within the combined beam, for detecting a difference between an optical path length of the reference beam and an optical path length of the measurement beam, the optical path length difference being a function of a displacement, or of a change in refractive index of the media, between the surfaces of interest, the detecting means including means for deriving a first synthetic wavelength and a second synthetic wavelength from the three optical wavelengths.

2. Apparatus as set forth in claim 1 and further including an optical fiber for conveying the output beam and the combined beam.

3. Apparatus as set forth in claim 2 wherein the optical fiber is a single mode optical fiber.

4. Apparatus as set forth in claim 3 wherein the optical fiber is a polarization maintaining fiber.

5. Apparatus as set forth in claim 1 wherein the detecting means includes a wavelength separation means for separating the combined beam into a plurality of beams each of which corresponds to one of the three wavelengths.

6. Apparatus as set forth in claim 5 wherein the wavelength separation means includes diffraction grating means, prism means, or optical filter means.

7. Apparatus as set forth in claim 5 and further comprising a plurality of photodetectors individual ones of which are disposed for receiving one of the plurality of beams for measuring a beam intensity thereof.

8. Apparatus as set forth in claim 7 and further including means, coupled to an output of each of the plurality of detectors, for processing the output thereof to determine a magnitude of the displacement between the two surfaces of interest.

9. Apparatus as set forth in claim 1 wherein the optical source means includes a first laser means providing at least two wavelengths and a second laser means providing a third wavelength.

10. Apparatus as set forth in claim 9 wherein at least one of the laser means includes a multi-mode laser diode.

11. Apparatus as set forth in claim 1 wherein the separating means includes at least one polarizing beamsplitter disposed for receiving the optical output of the source means and for orthogonally polarizing the reference beam with respect to the measurement beam.

12. Apparatus as set forth in claim 1 wherein the directing means includes means for focussing the measurement beam upon each of the surfaces of interest.

13. Apparatus as set forth in claim 12 wherein the directing means includes two-conjugate lens means for providing the measurement beam with two coaxially aligned focal points, one of which is coincident with the first surface of interest and the other of which is coincident with the second surface of interest.

14. Apparatus as set forth in claim 13 wherein the detecting means includes means for determining a displacement between the surfaces of interest.

15. Apparatus as set forth in claim 1 wherein the first surface of interest is associated with a reference object and the second surface of interest is associated with a test object.

16. Apparatus as set forth in claim 14 wherein the surfaces of interest are disposed upon opposite sides of a test object.

17. Apparatus as set forth in claim 16 and further including means for compensating the reference beam for a difference in optical path length between the reference beam and the measurement beam due to an index of refraction of the test object.

18. Apparatus as set forth in claim 1 wherein the providing means includes two polarizing beam splitters disposed for receiving the optical output of the source means and for orthogonally polarizing the reference beam with respect to the measurement beam.

19. Apparatus as set forth in claim 1 wherein the providing means includes one polarizing beamsplitter having first and second quarter wavelength retardation plates optically coupled thereto for orthogonally polarizing the reference beam with respect to the measurement beam.

20. Apparatus as set forth in claim 1 and further including means for phase modulating the reference beam with respect to the measurement beam.

21. A method for performing optical metrology, comprising the steps of:

generating an optical output having a plurality of optical wavelengths;

modifying the optical output to provide a phase modulated reference beam and a measurement beam that are orthogonally polarized with respect to one another, the measurement beam being directed to and reflecting from a first surface of interest and the reference beam being directed to and reflected from a second surface of interest;

combining the phase modulated reference beam and the reflected measurement beam into a combined beam; and responsive to a polarization state of three optical wavelengths within the combined beam, detecting a difference between an optical path length of the reference beam and an optical path length of the measurement beam, the optical path length difference being a function of a displacement between the surfaces of interest, the detecting step including the step of deriving a first synthetic wavelength and a second synthetic wavelength from the three optical wavelengths.

22. A method as set forth in claim 21 wherein the step of modifying includes a step of phase modulating the reference beam.

23. A method as set forth in claim 21 wherein the step of generating includes a step of simultaneously operating a first laser diode and a second laser diode, at least one of the laser diodes being a multi-mode laser diode.

24. A method as set forth in claim 21 and including a step of simultaneously translating the surfaces of interest with respect to the measurement beam.

25. A method as set forth in claim 21 wherein the first surface of interest is associated with a reference object and the second surface of interest is associated with a test object.

26. A method as set forth in claim 21 wherein the surfaces of interest are disposed upon opposite sides of a test object.

* * * * *